United States Patent [19]
Payne

[11] 3,731,597
[45] May 8, 1973

[54] ROTARY OPERATOR

[75] Inventor: Glen D. Payne, Houston, Tex.

[73] Assignee: The Arcas Company, Houston, Tex.

[22] Filed: Feb. 16, 1972

[21] Appl. No.: 226,834

Related U.S. Application Data

[63] Continuation-in-part of Ser. No. 42,240, June 1, 1970, abandoned.

[52] U.S. Cl.................................92/120, 92/129
[51] Int. Cl..........................F01c 9/00, F16j 1/10
[58] Field of Search...............92/120, 67, 65, 171, 92/129

[56] References Cited

UNITED STATES PATENTS

| | | | |
|---|---|---|---|
| 3,070,075 | 12/1962 | Hanselmann | 92/120 |
| 3,188,919 | 6/1965 | Sills | 92/120 |
| 3,229,590 | 1/1966 | Huska | 92/120 |
| 3,281,065 | 10/1966 | Chaffiotte | 92/120 |
| 3,312,146 | 4/1967 | Quere et al. | 92/65 |
| 3,446,120 | 5/1969 | Sneen | 92/120 |

Primary Examiner—Paul E. Maslousky
Attorney—Prabel, Wilson & Matthews

[57] ABSTRACT

A rotary operator for operating a valve or the like by rotating same a partial revolution in either rotational direction, wherein the operator has a pair of self-centering floating pistons movable by an arcuately curved piston rod in a tubular insert assembly mounted in a housing, and wherein each piston has a double O-ring seal which prevents misalignment and resultant binding of pistons during arcuate floating movement controlled by fluid pressure introduced into the insert assembly. The tubular insert assembly is made from conventional tubing which is bent to an arcuate shape so as to eliminate machining and other relatively expensive manufacturing costs.

6 Claims, 6 Drawing Figures

PATENTED MAY 8 1973 3,731,597

ROTARY OPERATOR

CROSS-REFERENCE TO RELATED APPLICATION

This application is a continuation-in-part of co-pending U. S. patent application, Ser. No. 42,240, filed June 1, 1970, now abandoned.

BACKGROUND OF THE INVENTION

The field of this invention is fluid-actuated rotary operators for valves and the like.

Motion converting apparatus employing an arcuate piston rod and pistons therewith in an arcuate housing, wherein the pistons are moved by fluid pressure, are known, examples of which are illustrated in U. S. Pat. Nos. 447,079; 1,006,157; 1,442,540; 2,287,960; 2,651,206; 2,936,636; 3,246,580; 3,444,788; and 3,446,120. The principal problems with respect to known apparatus of such type is the maintenance of a seal by the pistons as they move arcuately and dragging or other interference with the movement of such pistons by reason of the continuous change in direction of movement thereof. The cost of manufacture of such apparatus has also been extremely high due to the precise machining required in the arcuate cylindrical portions of the body or housing in an attempt to minimize dragging or other interference with the movements of the pistons therein.

SUMMARY OF THE INVENTION

The present invention relates to a fluid-actuated rotary operator having an operating rod which engages a freely floating piston at each end thereof, each piston having a pair of spaced seal rings, preferably O-rings, whereby the pistons move arcuately without cocking or otherwise interfering with their travel in an arcuate path in a tubular assembly. The tubular assembly is formed from a conventional tubing by bending same to shape and then inserting same in a housing which has been roughly sized by molding or otherwise economically shaping so as to receive said tubular assembly and the working parts of the rotary operator such as the operating rod.

DESCRIPTION OF THE PREFERRED EMBODIMENTS

Figure 1:
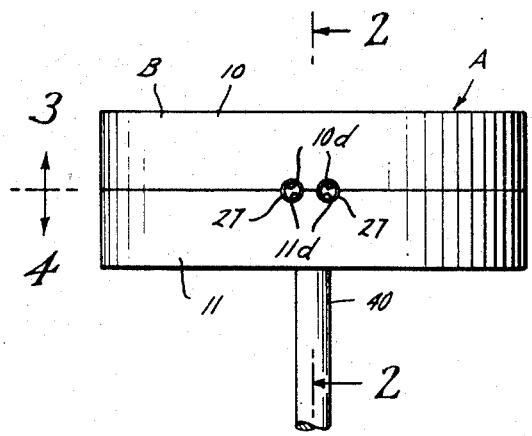
FIG. 1 is an elevation of the rotary operator of this invention, shown in position with the rotary shaft extending substantially vertically.
Figure 2:
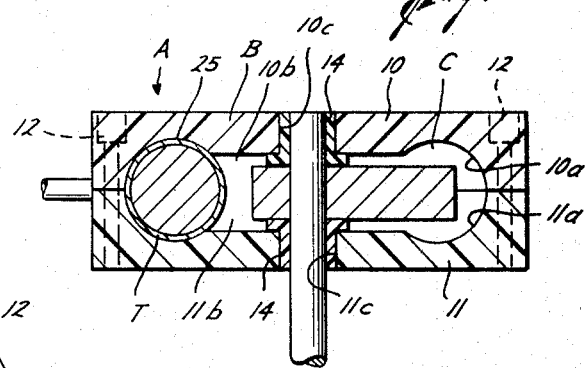
FIG. 2 is a vertical cross-sectional view taken on line 2—2 of FIG. 1.

In the drawings, the rotary operator of this invention is designated generally by the letter A and it includes a housing or body B which is preferably made in two halves 10 and 11 which are releasably joined together by connecting screws 12 or other suitable attaching means. Briefly, the housing B, when assembled as illustrated in FIGS. 1 and 2, has an annular chamber C in which a tubular insert assembly T (FIG. 6) is disposed. A piston assembly which includes an arcuate piston rod 20 and pistons 30 which are separate therefrom, as will be explained, are disposed so that the pistons 30 move within the tube 25 of the tubular assembly T. The arcuate piston rod 20 is connected to an operating shaft 40 which is connected to a valve or other equipment to be operated.

Considering the invention more in detail, the annular chamber C which is provided by the body or housing sections 10 and 11 is formed by two semi-cylindrical annular cavities or recesses 10a and 11a. Such cavities or recesses 10a and 11a communicate with a central recess 10b and 11b which together form the central opening inwardly of the annular chamber C. The housing section 10 has a shaft opening 10c and the housing section 11 has a similar shaft opening 11c, each of which has therein a bearing sleeve or insert 14 made of "Teflon" or other suitable bearing material. Such bearing members 14 are adapted to receive the shaft 40 therein as best seen in FIG. 2 so that the shaft 40 is supported for rotation, as will be more evident hereinafter.

The arcuate piston rod 20 is mounted within the circular chamber C so that its ends 20a are disposed in the tube 25 for engagement with the pistons 30, as will be more evident hereinafter. The arcuate piston rod 20 has a connecting central split ring 21 which is preferably integral with the piston rod 20 or is otherwise connected thereto by a connector strip 22. In the preferred form of the invention, the rod 20, the split ring 21 and the connector strip 22 are formed by molding, casting or otherwise as a unitary assembly. The ring 21 is split at 21a and it has an opening 21b through which the operating shaft 40 is adapted to extend. A fastener bolt 23 is threaded into a threaded bore 21c of the sleeve 21 so that after the shaft 40 has been positioned in the central opening 21b, the gap 21a may be reduced to tighten the ring 21 and thereby fasten same to the rod 40 for movement together. Thus, the rod 40 and the rod 20 are connected for movement together.

Figure 3:
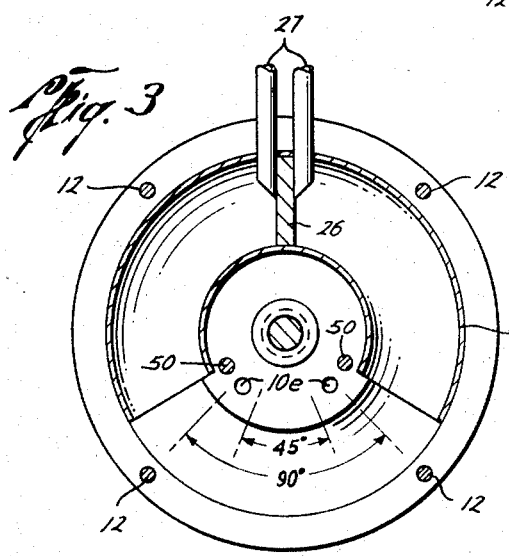
FIG. 3 is a view taken on line 3—3 of FIG. 1, but without the pistons and the arcuate piston rod therewith.
Figure 5:
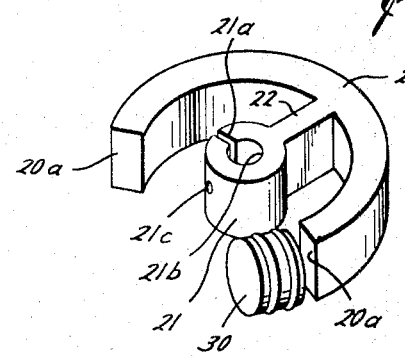
FIG. 5 is a view showing the preferred arcuate piston rod and one of the pistons in an exploded view.
Figure 4:
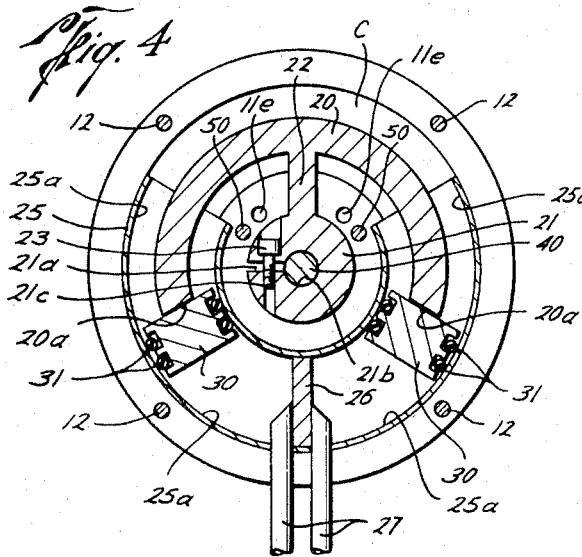
FIG. 4 is a sectional view taken on line 4—4 of FIG. 1 and illustrating the pistons and the piston rod disposed in the lower portion of the housing.
Figure 6:
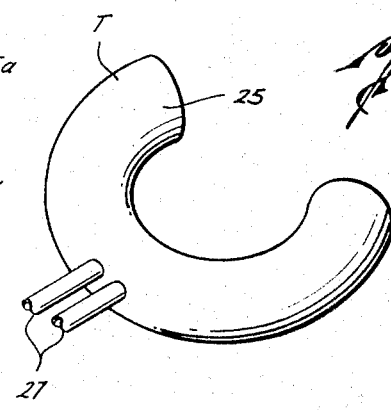
FIG. 6 is a view illustrating the tubular insert assembly by itself.

The tubular assembly T is formed of a single piece of tubing, preferably of light gauge steel which is capable of being bent into the arcuate shape illustrated in FIGS. 3, 4 and 6, without any substantial deformation thereof. The tube 25 is initially a straight tube of conventional tubing which is bent to shape in a suitable press of any known construction (not shown). By reason of such fabrication of the tube 25, the need for the machining, grinding or otherwise finishing of the inside surface of the walls forming the recesses 10a and 11a is eliminated, thereby substantially decreasing the cost of manufacture as compared to prior constructions wherein the surfaces were machined and similarly formed.

The tube 25 is divided in half by a generally circular divider plate 26 which is welded or is otherwise affixed in the bore 25a of the tube 25, so as to form two piston chambers, each of which receives one of the pistons 30.

The tube assembly T is also preferably fabricated prior to assembly with the rest of the apparatus A so as to include fluid pressure pipes or tubes 27 which are disposed on the opposite sides of the divider disc or plate 26 (FIG. 4). Such tubes or pipes 27 extend through the wall of the tube 25 and are welded or are otherwise affixed thereto so that air or other gas under pressure may be introduced and released in a known manner to and from the bore 25a of the tube 25, as will be more evident hereinafter. It should be noted that the housing sections 10 and 11 have appropriate semi-circular grooves 10d and 11d (FIGS. 1 and 3) for the positioning of the pipes 27 therein when the sections 10 and 11 are in the assembled relationship of FIGS. 1 and 2.

Each piston 30 is separate from the piston rod 20 but is engageable with an end 20a of the rod 20 so that each piston 30 is "floating." To prevent each piston 30 from cocking at an angle which might cause a binding of each piston 30 as it moves in the arcuate path defined by the bore 25a of the tube 25, each ring 30 has a pair of seal rings 31, preferably O-rings made of rubber or similar sealing material which engage the bore 25a. Such seal rings 31 are the only portions of the pistons 30 which actually engage the bore 25a so that there is always a seal between such rings 31 and the inside bore 25a, but there is no interference from any contact by any part of the piston 30 with such surface 25a. It has been found that the longitudinally spaced seal rings 31 on each piston 30 tends to guide each piston 30 smoothly in an arcuate path in contact with the inner surfaces of the bore 25a, without any substantial binding or interference with such movement.

The pistons 30 are moved in their arcuate path by introducing fluid such as air pressure through one of the tubes 27 into one side of the tube 25 for causing one of the pistons 30 to move and thus to transmit its movement to the piston rod 20. At the same time, the other tube or pipe 27 is connected so that it will exhaust air or other pressure within the other side of the tube 25 as the other piston 30 moves by the urging of the piston rod 20. The reverse is accomplished by reversing the flow through the tubes 27 so that an oscillatory movement or partial rotation in opposite directions for the shaft 40 is accomplished. The extent of such oscillatory or partial rotation of the shaft 40 may be regulated or limited by control stop pins 50 which are contacted by the connector plate or rib 22 in each direction of partial rotation of the connector rod 20. As shown in FIGS. 3 and 4, the stop pins 50 are disposed so that the angular movement of the operating shaft 40 is approximately 90°. Additional stop pin holes or recesses 10e and 11e are also provided so that the stop pins 50 may be moved into such openings if it is desired to limit the extent of oscillatory movement of the shaft 40 to an angle of approximately 45°, or at any angle other than the angle of 90° illustrated for the pins 50 in FIGS. 3 and 4. Thus, for each stroke of the valve operator A, the stop pins 50 are normally contacted and their position determines the amount of oscillatory movement which can be transmitted to the shaft 40.

In the use or operation of the apparatus A of this invention, the tube assembly T is prefabricated as a unitary assembly in the form essentially illustrated in FIG. 6. Then the piston rod 20 and the pistons 30 are positioned with the pistons 30 in the two sides of the tube 25, and they are all then laid in either the housing section 10 or 11 of the housing B. The shaft 40 is positioned in the ring 21 and is secured thereto by the fastener bolt 23, as explained. The stop pins 50 are positioned as desired for the amount of angular displacement or oscillatory movement of the shaft 40 which is desired as explained. Then, the other housing section 10 or 11 is assembled and secured to the first housing section 10 or 11, using the connector bolts 12 which fasten them together to complete the housing B. The pipes 27 are connected to suitable valves and a source of fluid pressure so that thereafter fluid pressure such as gas or air pressure may be introduced into one of the tubes 27 while discharging or exhausting from the other tube 27. Such control of the gas pressure causes the pistons 30 to alternately be urged in their arcuate path within the bore 25a of the tube 25 for thereby transmitting oscillatory movement through the piston rod 20 the split ring 21 and thus to the operating shaft 40.

The foregoing disclosure and description of the invention are illustrative and explanatory thereof, and various changes in the size, shape, and materials as well as in the details of the illustrated construction may be made without departing from the spirit of the invention.

I claim:

1. A rotary operator for a valve or the like, comprising a housing having a circular operating chamber internally thereof;
    a tubular insert assembly including a single metal tube bent to an arcuate shape and disposed in a portion of said operating chamber to form two arcuate piston chambers;
    a divider plate disposed in and fixed to the bore of said tube at substantially the mid-point thereof for dividing said tube into said two arcuate piston chambers;
    an arcuate piston rod disposed in said operating chamber and having its ends positioned in said arcuate piston chambers formed by said tube;
    a piston having annular seal means therewith disposed at each of said ends of said piston rod but separate therefrom and having no connection therewith; and
    fluid pressure means for alternately applying fluid pressure to each of said pistons for moving same and said piston rod arcuately therewith.

2. The structure set forth in claim 1, wherein:
    said fluid pressure means includes a pipe disposed on each side of said divider and communicating with each of said piston chambers in said tube.

3. The structure set forth in claim 1, wherein:
    said tube forms a liner for the major portion of said operating chamber.

4. The structure set forth in claim 1, wherein said annular seal means on each of said pistons includes:
    a pair of seal rings spaced from each other and providing the only contact by each piston with the inner surface of said piston chamber in which it moves for preventing each piston from cocking as it moves in the arcuate path defined by said tube.

5. The structure set forth in claim 4, wherein:
    each of said seal rings is an O-ring formed of rubber or a rubber-like material.

6. The structure set forth in claim 2, wherein:
    said housing is formed in two halves split so as to provide a semi-cylindrical annular groove in each which join together when said two halves are assembled to form a cylindrical annular groove defining said operating chamber.

* * * * *